Jan. 1, 1963  S. W. BAKER  3,071,270
LIFT TRUCK
Filed Sept. 21, 1959  6 Sheets-Sheet 1
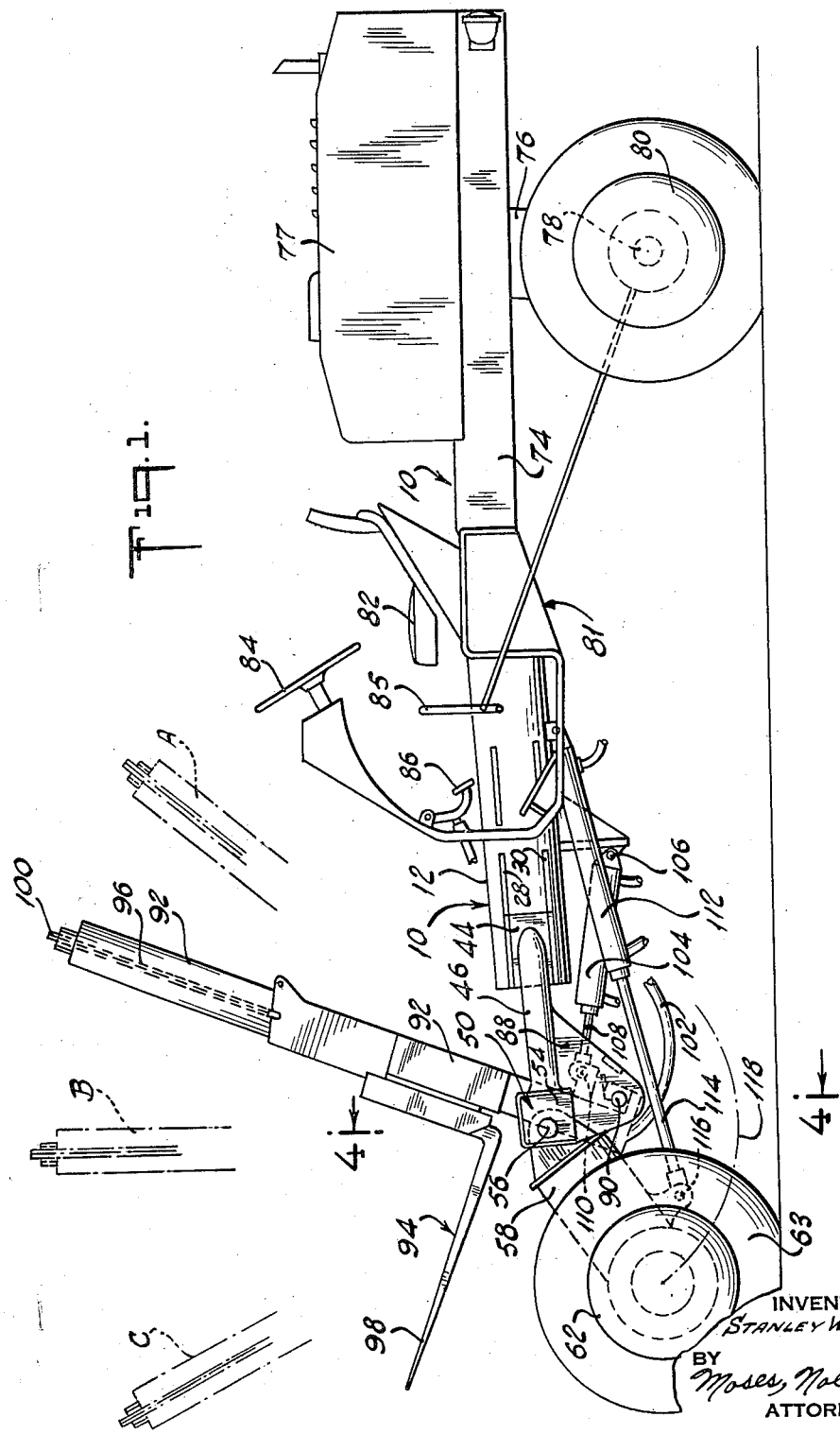
INVENTOR
STANLEY W. BAKER
BY Moses, Nolte, & Nolt
ATTORNEYS

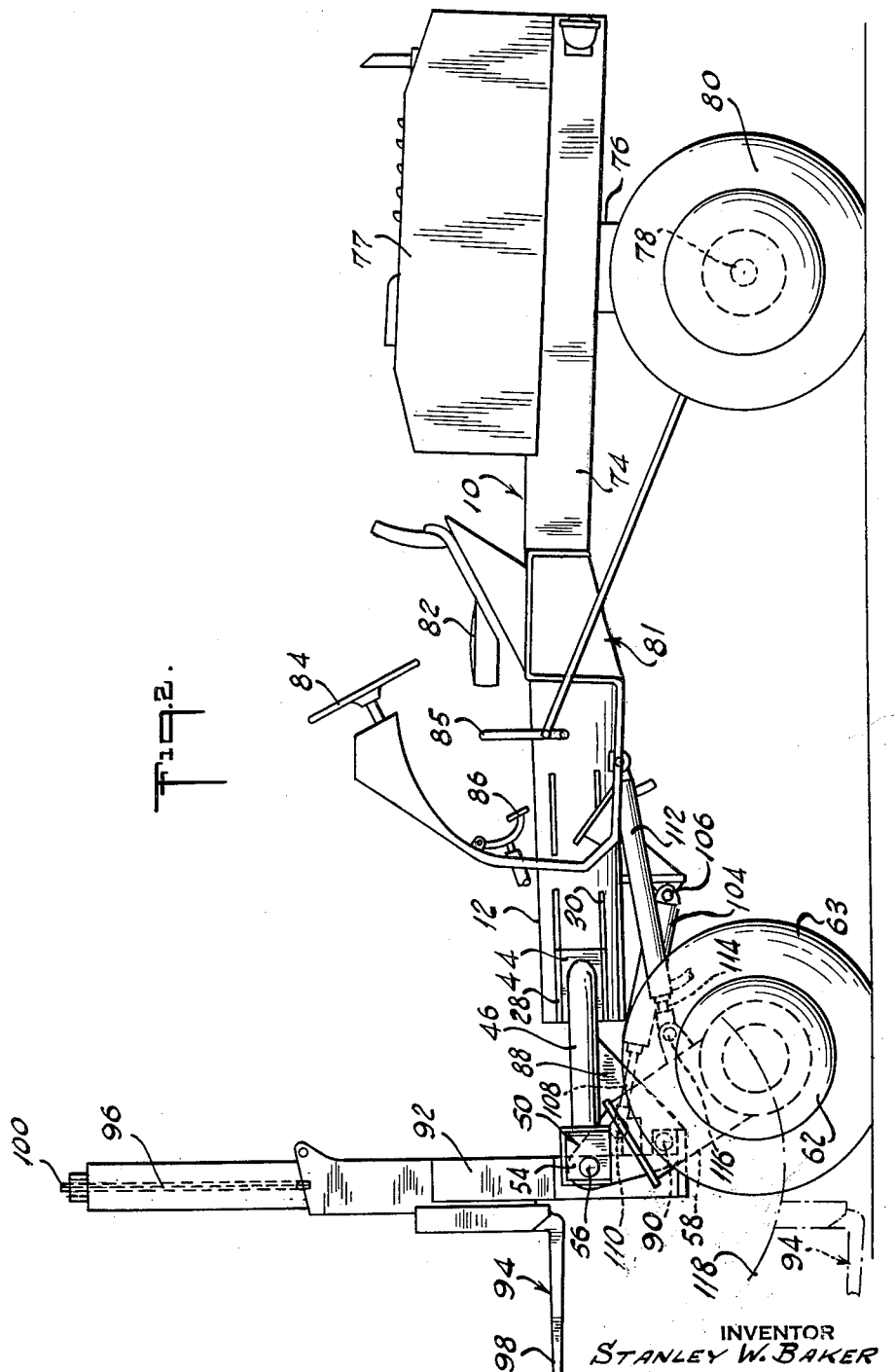

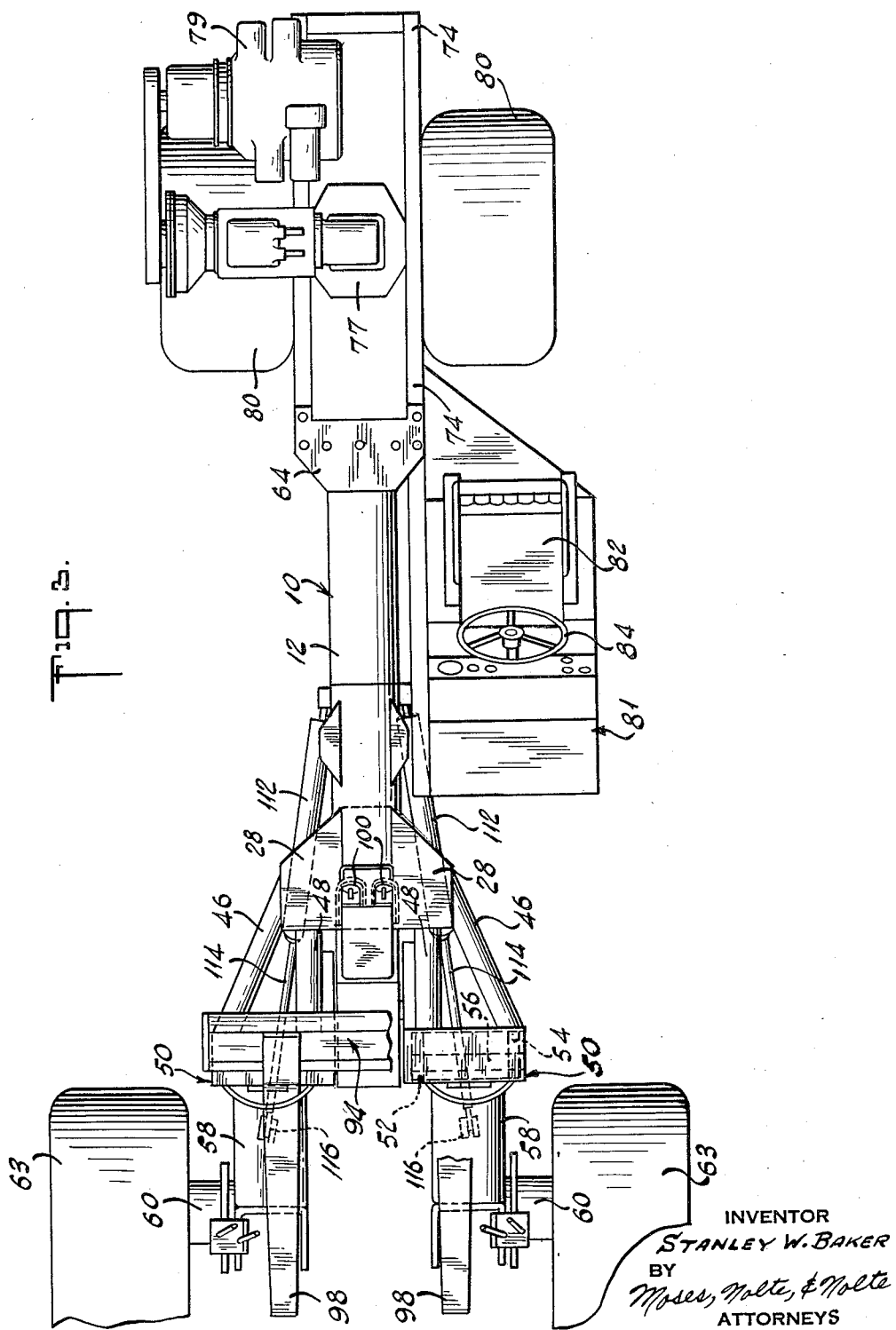

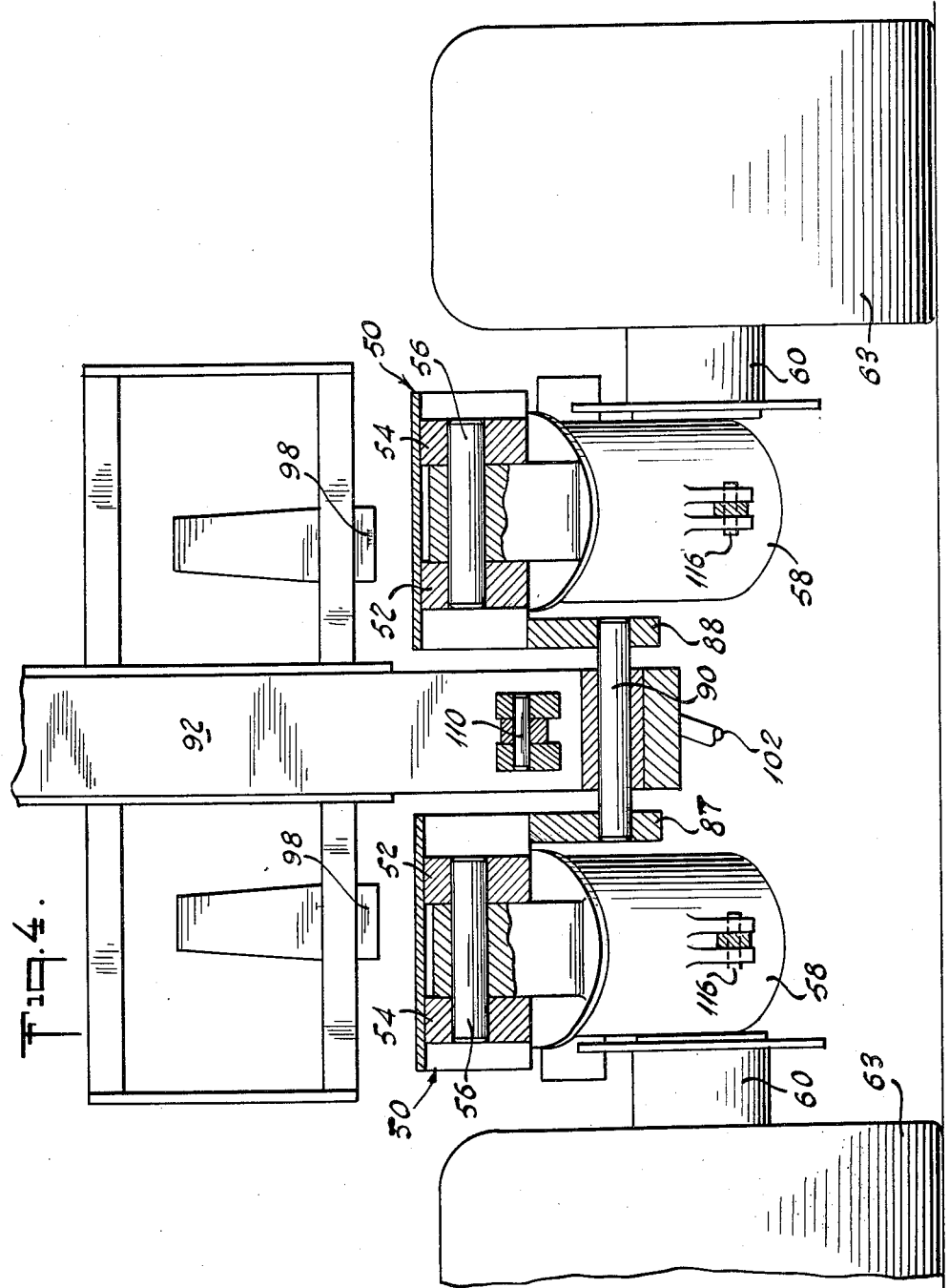

Jan. 1, 1963 S. W. BAKER 3,071,270
LIFT TRUCK
Filed Sept. 21, 1959 6 Sheets-Sheet 5
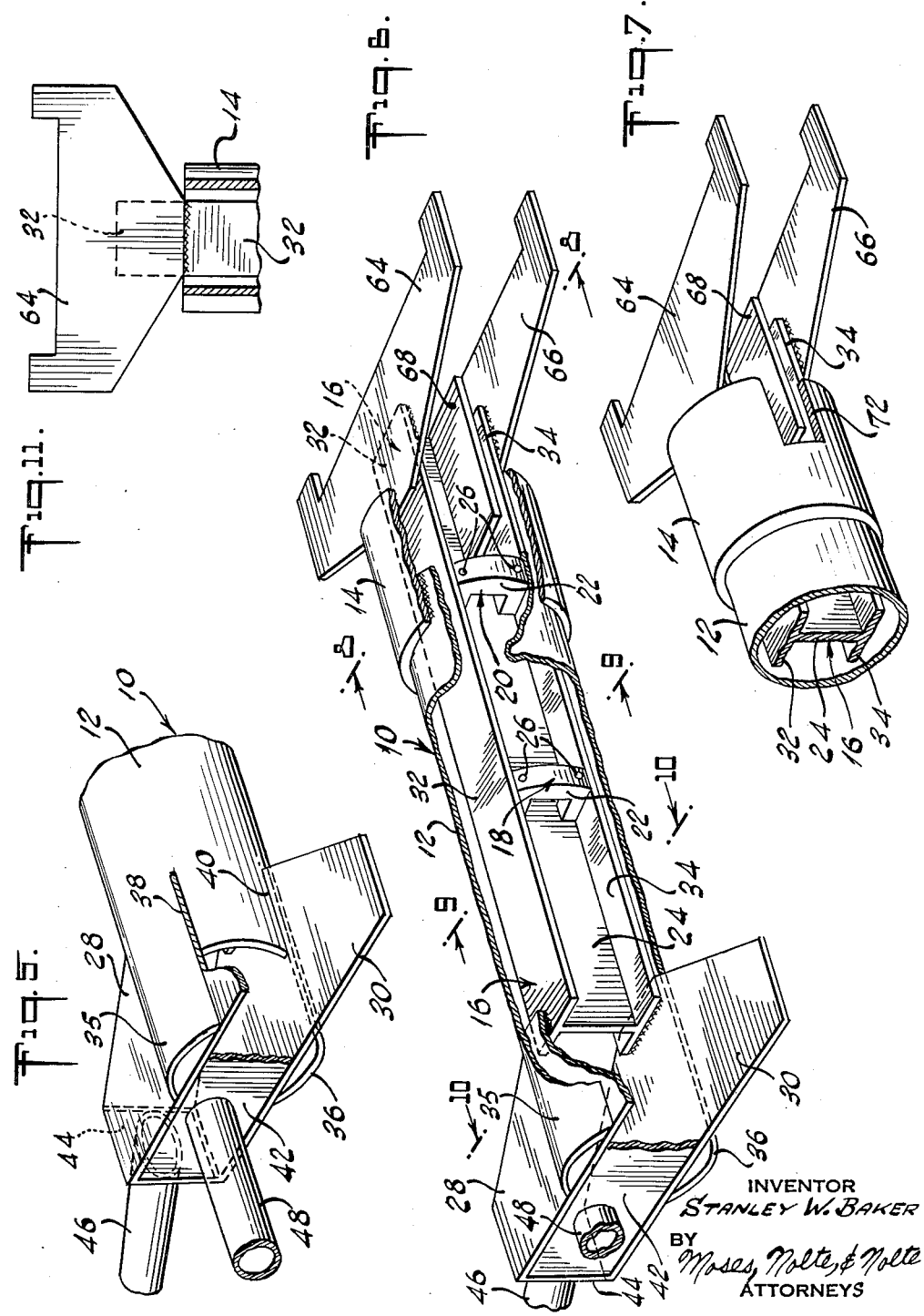
INVENTOR
STANLEY W. BAKER
BY
Moses, Nolte, & Nolte
ATTORNEYS

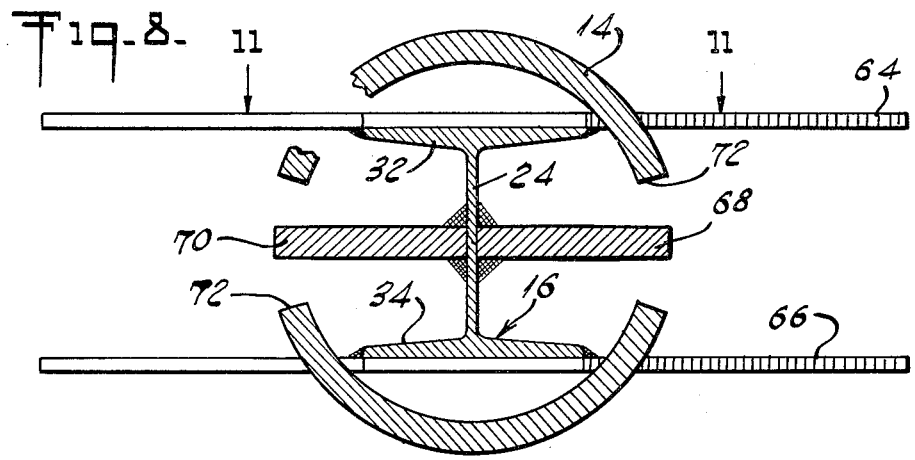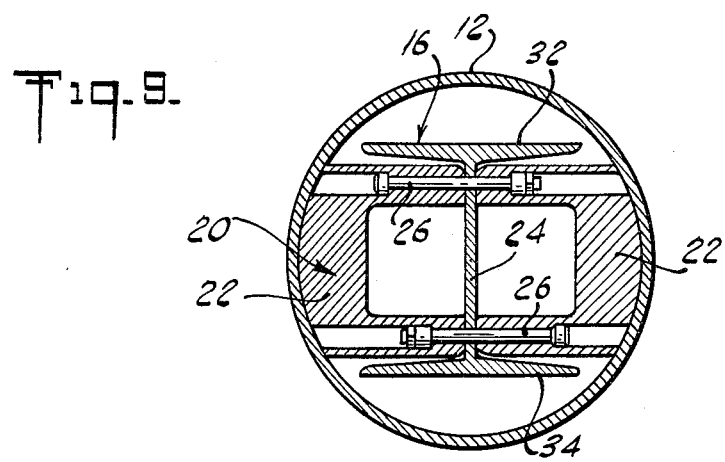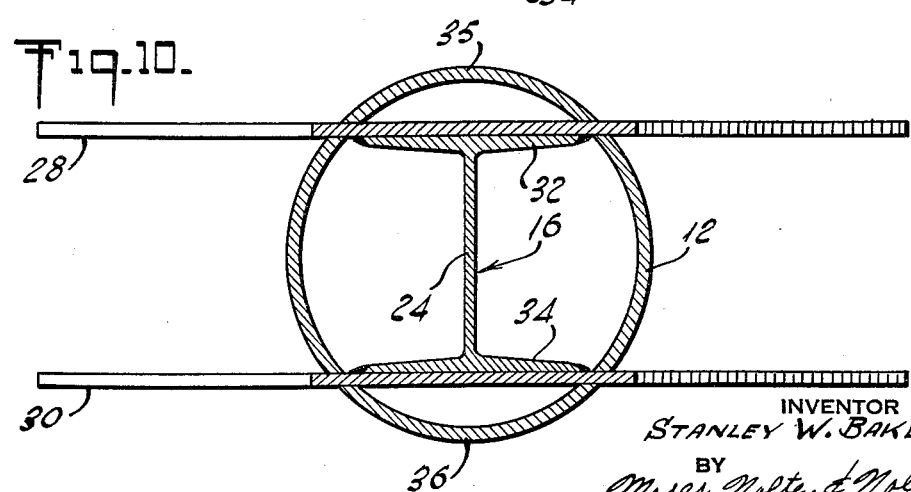

United States Patent Office 3,071,270
Patented Jan. 1, 1963

3,071,270
LIFT TRUCK
Stanley W. Baker, Ramsey, N.J., assignor to The Bergen Research Engineering Corporation, Teterboro, N.J., a corporation of New Jersey
Filed Sept. 21, 1959, Ser. No. 841,368
19 Claims. (Cl. 214—674)

This invention relates in general to vehicles and in particular to a new and useful lift-truck vehicle construction particularly adapted for use over rough terrain.

Previously lift-truck vehicles have included fixed axles and wheels and a lift-mast member which includes a vertically reciprocable fork-lift member. In some instances the lift-mast may be tilted backwardly in order to support the load in an inclined position, but in most cases the center of gravity of the load is carried in front of the forward wheels of the vehicle or in alignment with the wheels. Such vehicles are not very maneuverable and would become quickly bogged down if they were to be used over muddy or hilly terrain. Because the load cannot be easily shifted so that it can be carried between the forward and rear set of wheels, such vehicles are very unstable and the load is apt to easily fall off or tilt the vehicle especially in cases where the terrain level changes.

In accordance wtih the present invention, there is provided a vehicle of this character having a lift-mast member which is pivotable between a wide angular range on each side of the vertical and including a reciprocable fork lift member reciprocable on the mast. The vehicle includes a pivotal front wheel axle mounting, and hydraulic control means for shifting the position of the front wheels from a location far out in front of the end of the vehicle frame to a location with the front wheels retracted inwardly from the forward end of the vehicle frame. The arrangement permits shifting of the wheels inwardly to lower the fork lift to a location beneath the load and for effecting the picking up of a load. After the load has been elevated on the fork lift the wheels may be positioned in front of the vehicle in order to locate the load between the forward and rear axles of the vehicle.

The vehicle also includes a novel frame or chassis construction including means for supporting each of the front wheels independently and for distributing torsional stresses caused by any unevenness of the front wheels to be distributed through the frame without causing a rocking or torsional strain on the rear portion of the frame and without causing undue lifting of the rear wheels of the vehicle.

A further feature of the invention is the provision of means for braking the front set of wheels to permit the pulling forward of the vehicle in order to free the rear wheels of a rut, snowbank or similar obstruction. This is done by braking the front set of wheels and actuating the forward wheel retracting mechanism to effect the lifting of the rear wheels out of the recession.

The vehicle is particularly adapted for use in all types of rough terrain and for effecting lifting of devices which may be located on uneven terrain. The front wheels may be manipulated and the lift-gate positioned so that the lift-truck member presents the desired angle of approach to an object to be lifted regardless of on what level or incline the object is located.

Accordingly, it is an object of this invention to provide an improved vehicle for lifting and transporting articles.

A further object of this invention is to provide a lift-truck vehicle adapted for utilization over rough terrain.

A further object of this invention is to provide a lift-truck vehicle including a lift-mast at the forward end which is pivotable about a horizontal axis of the vehicle frame and including a vertically reciprocable fork associated with the lift-mast, the vehicle further including a forward wheel pivotally mounted at the front of the frame in the general vicinity of the lift-mast and means for shifting the axis of the wheel from a position well in advance of the forward end of the frame to a position retracted behind the forward end of the frame.

A further object of the invention is to provide a lift-truck vehicle having an improved chassis construction including means for supporting front wheels on each end of a transverse chassis member forming an extension of a torque tube chassis body and for independently supporting the rear wheels on a longitudinally extending I-beam torque member.

A further object of the invention is to provide a lift-truck vehicle including stationary rear wheels and a set of front wheels which are positionable between a location in front of the forward end of the frame of the vehicle to a location in back of the forward end of the frame and including means for separately braking each set of said sets of wheels.

A further object of the invention is to provide a lift-truck vehicle which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a side elevation of the vehicle constructed in accordance with the invention;

FIG. 2 is a side elevation similar to FIG. 1 but with the forward wheels positioned in a retracted position to permit lowering of the fork for lifting purposes;

FIG. 3 is a top plan view of the vehicle;

FIG. 4 is a fragmentary enlarged vertical section taken on the line 4—4 of FIG. 1;

FIG. 5 is a fragmentary perspective view of the chassis torque-tube construction;

FIG. 6 is a perspective view partly broken away of the chassis torque-tube construction;

FIG. 7 is a fragmentary perspective view similar to FIG. 6 of the rear portion of the chassis torque-tube construction;

FIG. 8 is a vertical section taken on the line 8—8 of FIG. 6;

FIG. 9 is a vertical section taken on the line 9—9 of FIG. 6;

FIG. 10 is a vertical section taken on the line 10—10 of FIG. 6; and

FIG. 11 is a horizontal section taken on the line 11—11 of FIG. 8.

Referring to the drawings in detail, the invention as embodied therein includes a lift-truck vehicle having a central torque-tube chassis generally designated 10 which comprises a longitudinally elongated forward cylinder or tube 12 and a rear cylinder or tube 14 of shorter longitudinal extent and of greater diameter than the tube 12 and which is positioned thereon and welded thereto. A longitudinally-elongated torsionally resilient member such as torsion I-beam generally designated 16 is located within the tubes 12 and 14 and extends from a point spaced rearwardly of the front end of the forward tube to a point spaced rearwardly of the trailing end of the rear tube 14.

Attached to the torsion I-beam 16 are two sets of spaced split bearing members generally designated 18 and 20. Each of the bearing members 18 and 20 includes segmental bearing support portions 22 which are located on opposite sides of a central web 24 of the torsion I-beam 16. Bolts 26 extend through the web 24 and secure each of the arcuate bearing supports on each side of the web. The portions 22 bear against the interior wall of the tube 12 to permit rotation of the torsion I-beam in respect to the tube 12.

In accordance with the invention, vertically spaced transverse plates 28 and 30 are secured to the top portion 32 and the bottom portion 34, respectively, of the torsion I-beam 16. Each of the transverse webs 28 and 30 include a forward edge of substantially greater width than the torsion I-beam 16 and a trailing web edge of approximately the same width as the torsion I-beam. The webs are attached to the I-beam as by welding at the location of the trailing edges.

Since the forward tube 12 extends to a point equal to the forward edge of the transverse webs 28 and 30 the tube is cut away at this end to leave top and bottom arcuate portions 35 and 36, respectively, above and below the webs 28 and 30. The tube 12 is also provided with longitudinally extending top and bottom slots 38 and 40 (FIG. 5) to accommodate webs 28 and 30, respectively. The arrangement is such that when the transverse webs 28 and 30 are turned about the axis of the tube 12 they effect turning of both the tube 12 and the torsion I-beam 16. The tube being relatively rigid turns slightly while the I-beam may twist under the application of the unbalancing forces.

The transverse webs 28 and 30 are joined by a front plate 42 and a side plate 44 (FIG. 5). A laterally extending diagonal tubular member 46 is connected to the side plate 44 and a forwardly extending tubular member 48 is connected to the front plate 42. Each of the tubular members 46 and 48 extend forwardly on each side of the transverse webs 28 and 30 and are connected to a journal box generally designated 50 located on each side of the vehicle (FIGS. 1, 2, 3 and 4). The journal boxes 50, 50 (FIG. 4) include spaced vertical bearing support members 52 and 54 which carry a bearing pin 56. Pivotally supported on the bearing pin 56 are cylindrical wheel supporting members 58 of relatively large mass to add to the weight of the vehicle at this end. Wheel axles 60, 60 are attached to the outboard sides of each of the cylindrical wheel supports 58. Each wheel axle 60, 60 carries a wheel 62 having a low pressure tire 63.

In accordance with the invention any torsional strain transmitted to the chassis by the vehicle while it is proceeding over rough terrain due to the front tires 63 encountering obstacles or changes in level, is transmitted through the transverse webs 28 and 30 to both the tubes 12 and 14 and the torsion I-beam 16. Since the tubes 12 and 14 are substantially rigid, they are not rotated to any great extent as the turning movement is transmitted rearwardly. The I-beam 16 will twist and absorb most of the turning forces acting on the chassis.

Vertically spaced transverse webs 64 and 66 are connected to the top 32 and the bottom 34, respectively, of the torsion I-beam 16 at the rear end thereof (FIGS. 6, 7 and 11). At this location the torsion I-beam 16 extends outwardly beyond the end of the rear tube 14. Extending outwardly from the web 24 are side plates 68 and 70 (FIG. 8) which normally ride in slot 72 which extends longitudinally inwardly from the rear end of the rear tube 14. The arrangement is such that torsion is transmitted from the front to the rear of the vehicle through the torsion I-beam 16 which is freely rotatable on the bearings 18 and 20 within the tube 12. This turning moment is absorbed by the I-beam up to a maximum twisting point and when the torsional force is unusually high the tubes 12 and 14 are rotated until the plate members 68 and 70 contact the tube 14 as the members are rotated to the edges of the slot 72. Further twisting of the I-beam is hindered after this point is reached by the tubes 12 and 14. The plates 68 and 70 are provided to insure that the I-beam is not subject to too great a turning moment which may cause its rupture.

Supported between the plates 64 and 66 is a rectangular frame 74 which extends rearwardly and supports a depending rear wheel axle supporting member 76 which holds an axle 78 for the rear wheel 80. Also supported on the rectangular frame 74 is an internal combustion engine 77 arranged to drive the rear wheels and to operate a compressor 79 for providing air pressure for the control of the pressure apparatus to be described more fully hereinafter.

Supported to one side of the chassis 10 is a cab member generally designated 81 including a driver's seat 82, a driving wheel 84, and controls for operating the vehicle. A hand brake 85 (FIGS. 1 and 2) is arranged to permit braking of the rear wheels 80 independently of the front wheels 62. The front wheels may be braked by use of a foot brake 86.

The spaced journal boxes 50, 50 (FIG. 4) at the forward end of the vehicle include downwardly depending members 87 and 88 which support a bearing pin 90 upon which is rotatably mounted a lifting mast 92. The mast 92 includes an L-shaped fork member 94 which is supported on the mast by a chain 96 and may be reciprocated upwardly and downwardly thereon. The L-shaped fork member includes outstanding lifting forks 98 which extend outwardly for the purpose of lifting articles thereon. The chain is moved over a top sprocket 100 under the control of air pressure from the compressor 78 through a hose connection 102.

In accordance with the invention, the mast 92 may be rotated about the pivot pin 90 in accordance with pressure admitted to either end of a control cylinder 104, one end of which is pivotally connected as at 106 to the chassis 10, and the other end of which is provided with a piston rod 108 which is pivotally connected to the mast 92 by means of a pin 110. (See FIGS. 1, 2, and 4.) As indicated in FIG. 1 the mast may be swung about its pivot from a dotted line location indicated at A through any of the locations indicated at B and C or any intermediate location. The wide angle of swing is provided in order to position the forks 98 in a substantially horizontal position for picking up an article even though the vehicle itself is moving over an inclined terrain. When it is desired to pick up an object which is located on a hill the front wheels 62 are pulled backwardly by applying pressure to either end of a control cylinder 112 to reciprocate a piston rod 114 which is pivotally connected to the wheel supporting members 58 by means of a pin 116. The front axle may be moved from the position indicated in FIG. 1 to the position indicated in FIG. 2 and in so doing the center of the axle swings through an arc indicated 118 in these figures. When the wheels are swung through the arc the vehicle is either raised or lowered depending on the distance of the center of the axis of the front wheels from its pivot point 56, the vehicle being elevated at the front end to its highest point when the center line of the front axle is below the pivot pin 56.

In order to pick up a load the wheels are moved inwardly so that the outer ends of the tires 62 are moved behind the front of the vehicle and the L-shaped fork may be dropped down to the ground ahead of the wheels (see FIG. 2). It should be appreciated that if the vehicle is on an incline the wheels may be moved backwardly a lesser or further distance in order to present the mast and the fork members 98 at the desired angle for picking up the article. After the load has been picked up instead of moving the load behind the wheels it is possible to move the wheels in front of the load by actuating the controls for the control cylinder 112 to cause the wheels to move ahead of the forward end of the vehicle. Since the mast can be swung through a wide angle and the wheels can be moved to any location between the positions indicated in FIGS. 1 and 2 the load can be carried at the desired angle and location on the vehicle and transported a considerable distance cross-country without effecting tilting of the vehicle or undesirable load conditions.

A further feature of the invention is the ability of the vehicle to withdraw itself from a mud hole, rut or similar obstruction. When the rear wheels 80 are bogged in mud for example, the brake 85 may be released and the foot brakes 86 applied to lock the forward wheels 62 against rotation. The control cylinder 112 is then actuated to cause the piston rod 114 to move backwardly and since the wheels 62 do not rotate, the vehicle is moved forward and the rear wheels 80 are pulled out of the rut.

Thus, the invention provides a vehicle which is very rugged and is capable of traveling over all sorts of terrain and of lifting articles regardless of where they are located. The load may be lifted by shifting the forward wheels behind the lifting mechanism and thereafter carried between the forward and rear wheels by shifting the front wheels to a new location ahead of the vehicle. It should be appreciated that without departing from the invention principles the truck may be constructed for travel in either direction and that either the front or the rear set of wheels may be pivotally suspended to permit shifting ahead of or behind the chassis or frame. The claims forming a part of this specification are not deemed to be limited in this respect.

While a specific embodiment of the invention has been shown and described in detail to illustrate the application of the invention principles, it will be understood that the invention may be embodied otherwise without departing from such principles.

What is claimed is:

1. A load lifting and load carrying vehicle comprising a chassis, a lifting mast member pivotally supported adjacent the front end of said chassis, means to pivot said mast relative to said chassis from a position substantially perpendicular to said chassis to a position substantially inclined rearward from perpendicular to said chassis, rear wheels suspended from said chassis, support means, forward wheels rotationally supported at one end of said support means, means pivotally connecting the opposite end of said support means to the forward end of said chassis, and means to position said support means and forward wheels at a preselected position between a location well in advance of the forward end of said chassis to a location rearwardly of the forward end and beneath said chassis.

2. A load lifting and load carrying vehicle according to claim 1, wherein said lifting mast member includes an elongated member pivoted at its lower end on said chassis and an outstanding fork lifting portion which is reciprocable on said elongated member.

3. A load lifting and load carrying vehicle according to claim 1, wherein said positioning means includes a cylinder pivotally connected at one end to said chassis, a piston rod reciprocable within said cylinder, and connected at its free end to said support means and pressure means to shift the position of said piston rod in said cylinder whereby to shift the position of said wheels.

4. A load lifting and load carrying vehicle comprising a chassis, a set of rear wheels connected to said chassis, a front wheel supporting member pivotally connected to said chassis, a front wheel rotatably supported by said front wheel supporting member, means to rotate said front wheel supporting member and said front wheel relative to said chassis through an arc extending below said chassis whereby to permit positioning of said front wheel at a predetermined location between spaced forward and rear extreme positions, a load lifting member attached to the forward end of said chassis, and means to pivot said lifting member relative to said chassis through an included arc having limits extending substantially forward and to the rear of the forward end of said chassis.

5. A load lifting and load carrying vehicle according to claim 4, wherein said means to rotate said front wheel supporting member includes relatively reciprocable piston and piston rod means pivotally connected to said chassis.

6. A lift-truck vehicle comprising a chassis, a rear set of wheels connected to said chassis, a lifting mast assembly, including an elongated member pivotally connected to the forward end of said chassis at a lower end thereof, and a lifting member reciprocable along said elongated member, means connected to said elongated member to incline the latter forwardly and rearwardly of its pivotal connection to said chassis, a forward wheel supporting member pivotally connected at its upper end to said chassis, at least one forward wheel rotationally supported at the lower end of said supporting member, and means to rotate said forward wheel supporting member about its connection to said chassis whereby to shift the location of said forward wheel between a position well in front of said vehicle and elongated member pivotal connection to a position beneath and spaced rearwardly from the front of said vehicle and elongated member pivotal connection.

7. A lift-truck vehicle according to claim 6, including independent brake means for said forward wheels and said rear wheels.

8. A lift-truck vehicle according to claim 6, wherein there is a forward wheel on each side of said vehicle and said elongated member is pivotally suspended between said forward wheels.

9. A lift-truck vehicle according to claim 8, wherein said chassis includes a longitudinally elongated tubular member having an outwardly transverse web connected to the forward end, said forward wheels being connected to each side of said transverse web, a longitudinally elongated torsionally resilient member connected to said transverse web and located within said tubular member, said torsionally resilient member being rotatable within said tubular member, and a transverse web connected to the rear portion of said torsionally resilient member and to said rear wheels whereby torque produced by the front wheels is transmitted to said tubular member and to said torsionally resilient member but only through said torsionally resilient member to said rear wheels.

10. A lift-truck vehicle according to claim 9, including a rear tubular member freely rotatable on the rear portion of said tubular member, said rear tubular member being slotted on each side, and a laterally extending member connected to the central portion of said torsionally resilient member and extending into the slots of said rear tubular member whereby to transmit turning movement of said torsionally resilient member to said rear wheels after said torsionally resilient member has rotated a predetermined amount.

11. A lift truck frame including a longitudinally extending tube, wheel supporting means affixed to said tube at each extremity of said tube including a plate extending transversely of said tube, and a torsionally resilient beam extending longitudinally within said tube attached rigidly at its ends to said plates and attached rigidly at only one point in its length to said tube.

12. A lift truck frame according to claim 11, wherein said torsionally resilient beam is an I-beam and there is provided a rear tubular member fitted over said tube and connected thereto, said rear tubular member having a slot fitted in at least one side thereof, and a laterally extending rotation limiting member for said beam connected to said longitudinal beam extending into the slot of said rear tubular member.

13. A lift truck frame according to claim 11 wherein said torsionally resilient beam is an I-beam and has split arcuate bearing members on each side of the beam web in bearing contact with said tube and means extending through the web of said beam to hold said split bearing members together.

14. A lift truck frame comprising a longitudinally extending first tube, a rear tubular member overlapping said tube and rigidly connected thereto, said first tube being slotted on each side, a transverse front wheel supporting plate extending through the slotted portion of said first tube, a torsion I-beam rotatably supported within said tube and rigidly connected to said transverse plate, a transverse rear wheel supporting plate rigidly connected to said I-beam, said rear tubular member having a slot in each side thereof and a member extending outwardly from the web of said I-beam into the slot of said tubular member, said slot being of greater dimension than the thickness of said member to permit limited angular movement between the rear wheel supporting plate and said rear tubular member.

15. A truck frame according to claim 14, including bearing means connected to the side of said torsion I-beam and in contact with said tube.

16. A truck frame according to claim 14 wherein said tube is provided at its forward end with vertically spaced slots on each side thereof and a pair of such transverse plates are provided extending into said slots and connected to the top and bottom of said I-beam respectively.

17. A truck frame according to claim 16, in which is provided additionally a second rear wheel supporting plate attached to the flange of said I-beam.

18. In a load carrying vehicle of the type having front and rear wheel means and an elongated frame mounted thereon, the improvement comprising load receiving means, means pivotally mounting said load receiving means upon said frame for rotational movement about an axis substantially transverse to the longitudinal axis of said frame, means to position said load receiving means relatively forward and rearward of said pivotal mounting means so that the center of gravity of a load supported thereon is also relatively shifted forwardly and rearwardly of said pivotal mounting means, and means to shift one of said wheel means from a position on one side of said load receiving means pivotal axis to the opposite side of said pivotal axis.

19. A load carrying vehicle according to claim 18, wherein said last mentioned means includes a wheel means supporting member, and means pivotally attaching the upper end of said supporting member to said frame, and actuator means operatively connected between said frame and said supporting member whereby said wheel means are shifted in an arcuate path from a position horizontally on one side of said load receiving means pivotal axis to the opposite side of said pivotal axis.

References Cited in the file of this patent

UNITED STATES PATENTS

| | | |
|---|---|---|
| 2,320,601 | Howell | June 1, 1943 |
| 2,623,653 | Framhein | Dec. 30, 1952 |
| 2,730,375 | Reimspiess | Jan. 10, 1956 |
| 2,906,543 | Polhemus | Sept. 29, 1959 |

FOREIGN PATENTS

| | | |
|---|---|---|
| 751,269 | Great Britain | June 27, 1956 |
| 1,047,719 | Germany | Dec. 24, 1958 |
| 1,148,019 | France | June 17, 1957 |